Patented Jan. 11, 1938

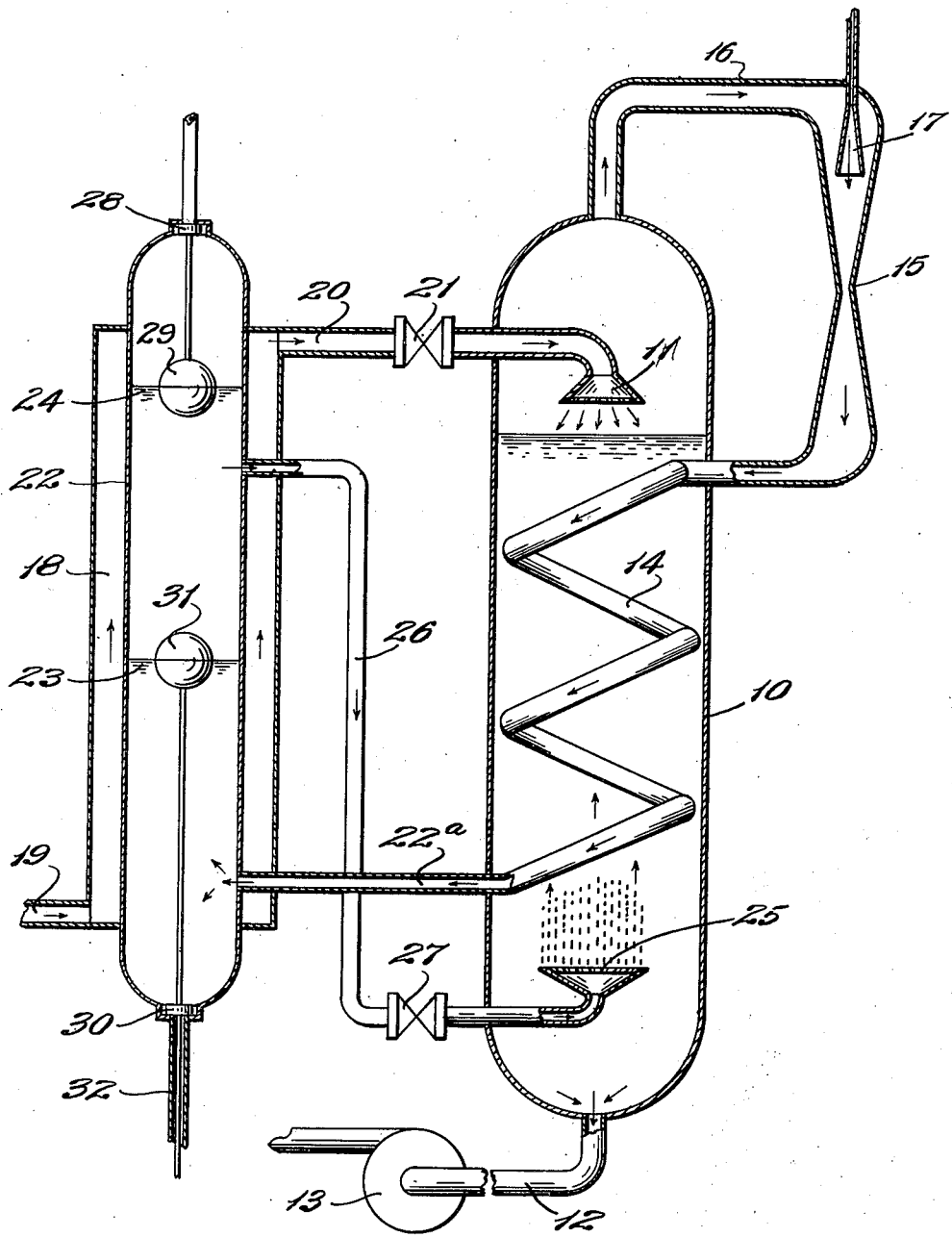

2,104,759

UNITED STATES PATENT OFFICE 2,104,759

METHOD OF REMOVING GASES FROM LIQUIDS

Bo Folke Randel, San Diego, Calif.

Application February 10, 1936, Serial No. 63,173

6 Claims. (Cl. 183—2.5)

(Granted under the act of March 3, 1883, as amended April 30, 1928; 370 O. G. 757)

This invention relates to a method of removing gases from liquids and it has a particular relation to removing oxygen, carbon dioxide, ammonia and other gases from boiler feed water.

The principal object of the present invention is the provision of a new and improved method and apparatus of the character described, in which an inert and relatively insoluble gas, such as a vaporized hydrocarbon, is diffused through the body of liquid containing a gas in suspension, so as to entrap and carry the same out of the liquid.

More specifically, the invention contemplates the removal of gases, such as ammonia gas, from boiler feed water by passing a hydrocarbon vapor through the water in bubble form so as to absorb the gas to be removed and carry it to a condenser where the vapor is liquified to liberate the gas.

With these and other objects in view, as well as other advantages which may be incident to the use of the improvements, the invention consists of the parts and combinations thereof hereinafter set forth and claimed, with the understanding that the several necessary elements constituting the same may be varied in proportion and arrangement without departing from the nature and scope of the invention, as defined in the appended claims.

In order to make the invention more clearly understood, there are shown in the accompanying drawing means for carrying the invention into practical effect, without limiting the improvements in their useful application to the particular construction, which, for purposes of explanation, have been made the subject of illustration.

The single figure of the accompanying drawing is a diagrammatic vertical sectional view of an apparatus by means of which the improved method may be practiced.

Referring to the drawing, the apparatus comprises a deaerating separator 10 into which the liquid containing a gas in suspension is introduced through a spray nozzle 11, and from which the deaerated liquid is drawn through a pipe 12 by means of a pump 13. A cooling coil 14 is provided within the separator 10 and communicates at its upper end with one end of a Venturi tube 15, the other end of which communicates through a pipe 16 with the upper end of the separator 10. A nozzle 17 is provided for projecting a jet of steam from a suitable source through the Venturi tube 15 at high velocity so as to develop a partial vacuum in the upper portion of the separator 10.

Water to be deaerated is supplied to the separator 10 from a receptacle 18 which is provided with an inlet pipe 19 and which communicates with the nozzle 11 through a pipe 20 and regulating valve 21. The receptacle 18 is in the form of a jacket surrounding a stratifier 22 which is cooled by the gas ladened water passing to the separator 10 through the receptacle 18. The stratifier 22 communicates with the lower end of the coil 14 through a pipe 22a and contains a body of water 23 and a body of hydrocarbon liquid 24, such as kerosene, floating thereon, the water 23 being the condensate from the steam projected from the nozzle 17 and a certain amount of water vapor entrained thereby. The upper portion of the stratifier 22 containing the liquid hydrocarbon 24 communicates with a spray nozzle 25, located in the lower portion of the separator 10 through a pipe 26 and expansion valve 27.

A valve 28 operated by a float 29 is located in the upper end of the stratifier 22 for controlling the escape of liberated gases from the upper portion of the stratifier, and a valve 30 operated by a float 31 is located in the lower end of the stratifier 22 for controlling the discharge of the condensate 23 through a pipe 32. The buoyancy of the float 31 is such that it will float upon the surface of the water 23 but submerged within the hydro-carbon 24.

In operation, the gas ladened water introduced into the receptacle 18 from the supply pipe 19 passes through the pipe 20 and valve 21 and is sprayed into the separator 10 through the nozzle 11. The jet of steam projected through the nozzle 17 creates a partial vacuum in the upper portion of the separator 10. This reduced pressure, together with the difference in the hydrostatic heads of the liquid hydrocarbon in the stratifier 22 and in the spray nozzle 25, causes the liquid hydrocarbon to flow through the expansion valve 27, where it is vaporized so that it passes through the nozzle 25 in the form of uniformly distributed bubbles. These bubbles ascend through the water in the separator and absorb the insoluble gases therein. As soon as this vaporized hydrocarbon, with the gases entrapped thereby escapes from the water it is drawn through the Venturi tube 15 and forced through the cooling coil 14, where the hydro-carbon vapor and steam are condensed. The water of condensation and liquified hydrocarbon then pass into the stratifier 22, where they stratify according to their specific gravities into the two bodies 23 and 24, the liberated insoluble gases collecting in the upper portion of the stratifier and the liquified hydrocarbon returns to the separator 10. The water in the separator after being deaerated passes to the boiler through the pipe 12 and pump 13. The condensate 23 as it collects in the lower portion of the stratifier 22 raises the float 31 and opens the valve 30 and permits it to escape through the pipe 32. Any lowering of the level of the liquid hydrocarbon 24 will cause the valve 28 to open so as to permit of the escape of the liberated insoluble gases in the upper portion of the stratifier 22. It will be understood that the condensate 23 will probably contain some of the gases liberated from the boiler feed water in the separator 10 and entrained in the steam passing into the coil 14, but inasmuch as the condensate is not fed to the boiler, this is of no consequence.

In passing through the separator 10 the hydrocarbon vapors will absorb a certain degree of heat and also some water will be evaporated, but this absorption of heat will assist in cooling the condensing coil 14.

In the foregoing description, water, ammonia, hydro-carbon liquid, etc., have been referred to as the mediums employed, but it is to be understood that the invention is not limited to these mediums, as the process may be used to remove any gas from any liquid, or to purify any liquid and to employ any suitable medium for the purpose. Also, the apparatus is not restricted to the particular construction and arrangement shown. A vacuum pump or either of the liquid jet or mechanical type may be used in place of the ejector.

Other modifications and changes in the proportion and arrangement of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

I claim:

1. The method of removing absorbed gases from a liquid in which they are in solution comprising vaporizing a non-miscible fluid and passing the same in diffused form through the liquid to absorb the dissolved gases, entraining the vaporized fluid and liberated gases in a jet of vaporized liquid, condensing the vapor and vaporized liquid and stratifying the same, vaporizing the condensed non-miscible fluid and passing the same again through said solution.

2. Apparatus of the character described comprising a separator for containing a solution of water and a gas and having an inlet for said solution and an outlet for the water freed from gas; a stratifier for containing superimposed bodies of water and a non-miscible fluid of a different specific gravity, the portion of said stratifier containing the non-miscible fluid communicating with said separator below the liquid level of the solution therein; a condenser communicating with said separator above the liquid level of said solution and with said stratifier; and a steam injector communicating with said separator and said condenser for reducing the pressure within said separator to cause said non-miscible fluid to flow upwardly through said solution and absorb the gas therein and to vaporize said fluid, the steam injected by said injector entraining the vaporized fluid and the liberated gas and conveying the same through said condenser to said stratifier where the condensed fluid and steam are stratified; means controlled by the liquid level of the fluid in said stratifier for permitting the escape of liberated gas from said stratifier; means controlled by the liquid level of the water in said stratifier for permitting the escape of the water therefrom; and means for withdrawing from the separator the water freed from gas.

3. The method of removing gases from a liquid in which they are dissolved comprising vaporizing a hydrocarbon fluid and passing it through the liquid for absorbing the dissolved gases, entraining the vaporized hydrocarbon fluid and absorbed gases in a jet of vaporized motive medium and simultaneously creating an area of reduced pressure above the surface of the first mentioned liquid to facilitate the passage of said vapor therethrough, condensing the vaporized hydrocarbon fluid and motive medium and stratifying the same, again vaporizing the hydrocarbon fluid and passing the same again through said liquid.

4. The method of removing gases from a liquid in which they are dissolved comprising diffusing a hydrocarbon fluid and passing it in the form of bubbles through the liquid to entrap the dissolved gases, entraining the diffused hydrocarbon fluid and entrapped gases in a jet of vaporized motive medium and simultaneously creating an area of reduced pressure above the surface of the first mentioned liquid to facilitate the passage of said vapor therethrough, condensing the diffused hydrocarbon fluid and motive medium and stratifying the same, again diffusing the hydrocarbon fluid and passing the same again through said liquid.

5. Apparatus of the character described comprising a separator for containing a solution of water and a gas and having an inlet for said solution and an outlet for the water freed from gas; a stratifier for containing superimposed bodies of water and a non-miscible fluid of a different specific gravity, the portion of said stratifier containing the non-miscible fluid communicating with said separator below the liquid level of the solution therein; a condenser communicating with said separator above the liquid level of said solution and with said stratifier; means communicating with said separator and said condenser for reducing the pressure within said separator to cause said non-miscible fluid to flow upwardly through said solution and absorb the gas therein and to vaporize said fluid and water, said means also causing the vaporized fluid and water and the liberated gas to flow from said separator through said condenser to said stratifier where the condensed fluid and water are stratified; means for permitting the escape of liberated gas from said stratifier; means for permitting the escape of condensed steam from said stratifier, and means for withdrawing from the separator the water freed from gas.

6. Apparatus of the character described comprising a separator for containing a solution of water and a gas and having an inlet for the solution and an outlet for the water freed from gas; a stratifier for containing superimposed bodies of water and a non-miscible fluid of a different specific gravity, the portion of said stratifier containing the non-miscible fluid communicating with said separator below the liquid level of the solution therein; a condenser communicating with said separator above the liquid level of said solution and with said stratifier; a steam injector communicating with said separator and said condenser for reducing the pressure within said separator to cause said non-miscible fluid to flow upwardly through said solution and absorb the gas therein and to vaporize said fluid and water, the steam injected by said injector entraining the vaporized fluid and the liberated gas and conveying the same from said separator through said condenser to said stratifier where the condensed fluid and steam are stratified; means for permitting the escape of liberated gas from said stratifier; means for permitting the escape of condensed steam from said stratifier, and means for withdrawing from the separator the water freed from gas.

BO FOLKE RANDEL.